United States Patent
Sesek et al.

(10) Patent No.: US 7,113,303 B2
(45) Date of Patent: Sep. 26, 2006

(54) JOB QUEUING BASED ON PRINT HEAD POSITION

(75) Inventors: Robert Sesek, Meridian, ID (US); Steve Orrin Rasmussen, Vancouver, WA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 812 days.

(21) Appl. No.: 10/283,575

(22) Filed: Oct. 30, 2002

(65) Prior Publication Data

US 2004/0085568 A1 May 6, 2004

(51) Int. Cl.
*G06K 15/10* (2006.01)

(52) U.S. Cl. ............... 358/1.15; 358/1.8; 358/1.14; 358/1.18

(58) Field of Classification Search ............. 358/1.4
See application file for complete search history.

(56) References Cited

U.S. PATENT DOCUMENTS

| 5,287,194 | A  | * | 2/1994  | Lobiondo ............ 358/296  |
| 6,290,316 | B1 | * | 9/2001  | Buckby ................ 347/14 |
| 6,332,170 | B1 | * | 12/2001 | Ban ..................... 710/6 |
| 6,334,720 | B1 | * | 1/2002  | Kato et al. ............ 400/74 |
| 6,431,774 | B1 | * | 8/2002  | Matsumoto ........... 400/225  |
| 6,549,300 | B1 | * | 4/2003  | Motamed et al. ...... 358/1.18 |

* cited by examiner

*Primary Examiner*—Mark Zimmerman
*Assistant Examiner*—Vincent M. Rudolph

(57) ABSTRACT

A system and method for ordering a queue of print jobs in a high volume printing operation employing movable print heads. A plurality of print jobs are sorted and executed according to print head position specifications for one or more movable print heads such that the total number of print head adjustments is minimized.

31 Claims, 3 Drawing Sheets

JOB QUEUING BASED ON PRINT HEAD POSITION

BACKGROUND OF THE INVENTION

1. Field of the Invention

The present invention relates to printing operations. More specifically, the present invention relates to printing systems that employ movable print heads and process a variety of print jobs.

2. Description of the Related Art

High volume printing and mailing operations face a variety of challenges that are not present in low volume and manually operated printing and mailing operations. In a high volume operation, there are frequently large numbers of media pages or mail pieces that are of a consistent size and that are processed in a single print job with only slight variations, such as differing addresses. In a typical high volume printing operation, a large number of different jobs may be processed from time to time and the printed media and mail pieces may vary from job to job.

Handling large volumes of printed items and mail pieces and printing variable addresses on the mail pieces requires high-speed equipment. While a simple office laser or inkjet printer may suffice for printing envelopes in a small mail-volume office, in a high-volume operation, specialized machines are used for printing addresses, return addresses and other variable text and images onto media pages and mail pieces.

One approach is to use a printing machine with two or more print heads that are moveable along parallel axes and to set each print head at a fixed position along its axis, where it remains for the duration of each job. For example, a first print head may be positioned to print a delivery address near the middle of an envelope and a second print head positioned to print a return address near the top of an envelope. The print heads need not be moved along their respective axes unless the media size or printing positions change. During the printing operation, the media to be imprinted is moved laterally with respect to the print head axes as the print heads imprint characters or images onto the media. This approach is used with high-speed ink-jet printers, but the same approach also applies to offset printers, dot-matrix printers, and other print head technologies.

In an inkjet print head, when implemented in a fixed head configuration, each print head comprises a row of nozzles that spray ink droplets onto the media as it passes in front of the printing head. The modulation of the nozzle spray droplets, synchronized with the movement of the media, enables the formation of characters and images in the ink droplet spray patterns.

The positions of the print heads are changed when the media size changes or when the printing positions on a given media size are changed. In prior systems, it is common for the print head position to be changed manually by sliding the print head up or down its axis, and then securing it in a fixed position with a set screw. In operation, a technician determines the required vertical offset for each print head position according to the print job specifications and then measures or otherwise calibrates the print heads along their vertical mounting axes at positions consistent with the job's printing requirements. The print head position determines the vertical position of the print on the media. The printing positioning along the lateral dimension of the media is determined by the timing relationship between the start of the print operation with respect to the lateral starting position of the media under the print head. In the prior art, the lateral positioning task is automated and under the control of a printing controller. The task of changing print head positions necessarily shuts down the printing and processing functions.

It is desirable to minimize down time in a high volume printing or mailing operation, and it is common for a processing line to run nearly continuously during a work shift. While many printing jobs involve the printing of a large number of similar items, modern processing machinery operate at very high speeds. Consequently, the print head positions may be changed frequently during a typical shift. Changing print head positions consumes time, increases wear and tear on equipment, and results in reduced efficiency of a processing operation. Even in systems that employ automated print head position changes, each change produces the aforementioned undesirable results.

Thus there is a need in the art for a system and method for reducing the frequency with which print head positions must be changed in a printing or mailing operation.

SUMMARY OF THE INVENTION

The need in the art is addressed by the systems and methods of the present invention. In an illustrative embodiment, a printing system with an adjustable position print head and related components is taught. The related components include a memory that has a plurality of print jobs stored therein, which, as a minimum, is the address information for plural locations. Also included is a controller coupled to the memory that operates to sort the plurality of print jobs into an ordered list according to the print head position requirements therefor, The print jobs are then executed in accordance with the ordered list. As an alternative, the ordered list may be output via a display panel, a printable file, or other suitable device.

In a refinement of the invention, the controller operates to segment and order the plurality of print jobs according to periods of time during which print jobs are to be processed. This segmentation may be by job shift, by day, by periods during which print job deadlines fall or other arbitrarily defined time periods. This segmentation and ordering of print jobs allows the system to prioritize job completion, as well as to manipulate print head adjustment time to fall within certain time windows.

The system can also apply automated print head adjustments. This is accomplished with an additional mechanism, coupled to the means for outputting, for automatically adjusting the print head position. This mechanism adjusts the print head position in accordance with a current output print head position specification prior to processing each print job if the print head position changed from the print head position specified in the previous print job. The controller is adapted to sort in either ascending or descending order of print head position specification magnitude. In more complex implementations, the printing system includes plural print heads having plural corresponding print head position specifications. The controller then operates to sort and test plural mathematical permutations on the order in which the plural print head position specifications may be taken and selects the one of the permutations that requires the fewest print head position changes to produce the final ordered list. In at least one embodiment, the print heads are inkjet print heads.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention generally encompasses a system and method where print jobs processed in an inkjet, offset, or other type printer (for example, an offset postage metering printer or high speed inkjet address printer) are queued based on the position of the print heads. More particularly, all of the print jobs in a given batch of print jobs that require a particular print head position are queued together, to minimize the number of times that the print heads must be moved to print all of the jobs in a given batch of print jobs.

By reducing the number of times the print heads must be moved during the processing of a given batch of print jobs, the illustrative embodiments of the present invention minimize the down time required for manually moving print the heads. The illustrative embodiments of the present invention therefore increase throughput of the printing system. This is true whether the system employs manually movable print heads or print heads that are movable automatically through an automated control system. In either case, the illustrative embodiments of the present invention minimize the number of movements needed for the print heads during a given period of time or number of print jobs processed. This also reduces wear and tear of the print heads and their support assemblies, and reduces the likelihood of other problems associated with moving the print heads frequently. Those skilled in the art will also appreciate that frequently moving the print heads increases printing errors and increases downtime significantly, while reducing overall system throughput.

Figure 1:
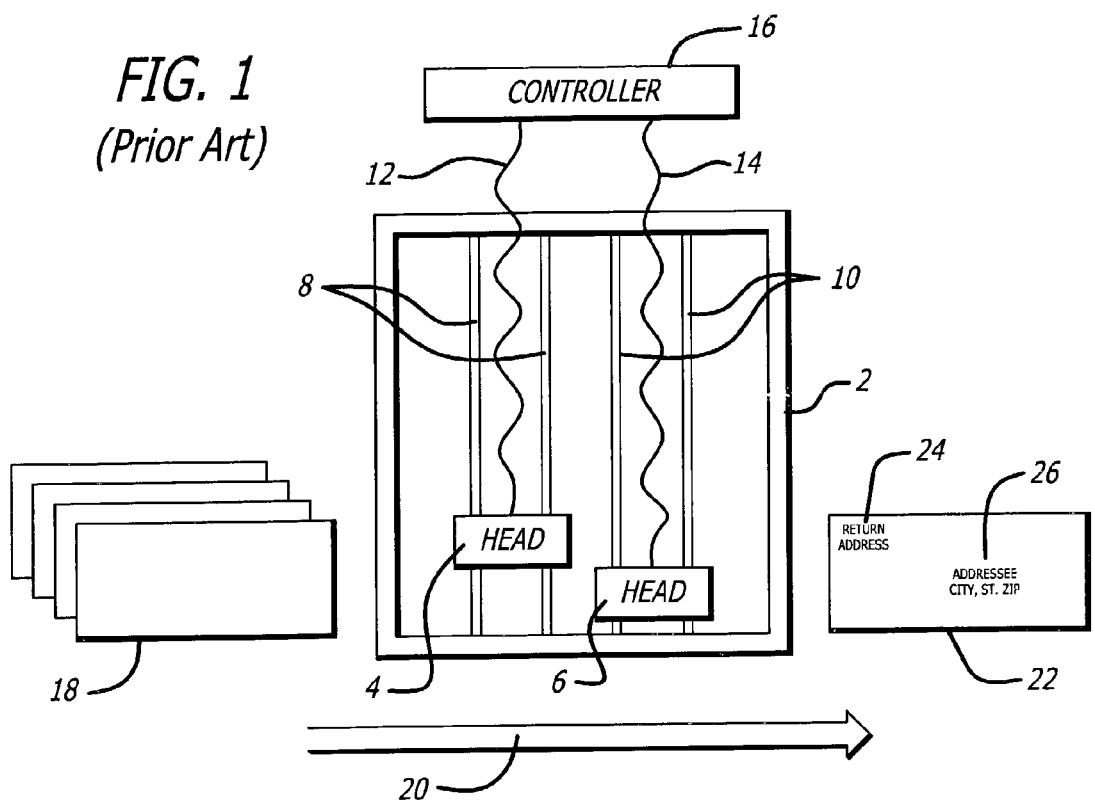
FIG. 1 is a diagram of a prior art printing system processing standard sized envelopes.

Reference is directed to FIG. 1, which is an illustration of the essential components in a prior art high-speed inkjet address printing system employing two movable print heads. A carriage assembly 2 supports two movable print heads 4, 6. Print head 4 is slideable or otherwise repositioned along a single vertical axis defined by support rods 8. Print head 6 is slideable along a single vertical axis defined by support rods 10. The print heads are manually movable along their respective axes and are fixed in position by a set screw (not shown) or other retaining mechanism, as are understood by those skilled in the art. A supply of media 18 is processed through the printing system, each item being imprinted with a unique address and return address in this prior art embodiment.

In FIG. 1, the media 18 is a #10 business envelope. Each envelope traverses 20 the carriage assembly 2 and passes in front of print heads 4 and 6. A controller 16 establishes a registration for each envelope and controls the speed at which each envelope laterally traverses (direction 20) the printing carriage 2. The first print head 4 is positioned along the vertical dimension of the printing carriage 2 such that it aligns with the return address position 24 on each printed envelope 22. The second print head 6 is positioned along the vertical dimension of the printing carriage 2 such that it aligns with the address position 26 of each printed envelope 22.

During each printing operation, the controller 16 communicates the printing command and data to each of the print heads 4, 6 through interface cables 12, 14, respectively. The controller synchronizes the moment that each print command is sent to the print head with the known position of each envelope so that the lateral position of each printed area is in accordance with the print job specifications. Each print job includes both lateral and vertical print position specifications, as will be more fully discussed hereinafter.

Figure 2:
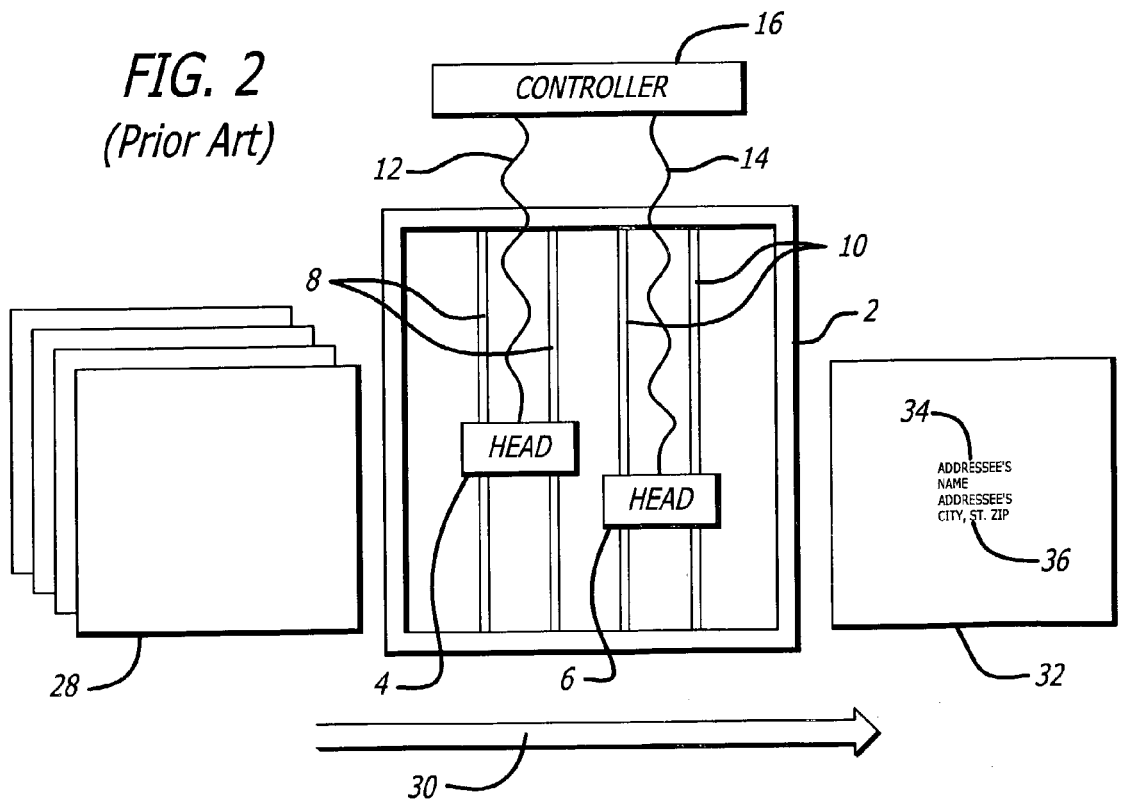
FIG. 2 is a diagram of a prior art printing system processing large sized envelopes.

FIG. 2 illustrates the same prior art printing carriage 2 and related components as those illustrated in FIG. 1 except that a different media size 28 is being processed in FIG. 2. The example of the prior art system in FIG. 2 processes 5"×7" envelopes 28. Note that the finished envelope 32 does not include a return address. Instead, it includes a mailing address that is comprised of two printed sections 34, 36. Print head 4 is positioned to print the upper portion 34 of the address and print head 6 is positioned to print the lower portion 36 of the address on the printed envelope 32 as it traverses (direction 30) the print carriage 2. It is then to be appreciated that the prior art printing system allows movement of the print heads to imprint characters and images anywhere on the surface of a piece of media. The prior art also teaches the implementation of a printing system that does not require the synchronization of lateral movement of the media with the timing of print operations. Instead, the media is placed in a fixed position in the print carriage during the printing operation and the print head(s) are positioned both laterally and vertically on the media at the desired location. The printing operation then commences without any change in the orientation between the media and the print head during the physical printing operation. This type of system is commonly employed with offset printing print head technology.

Figure 3:
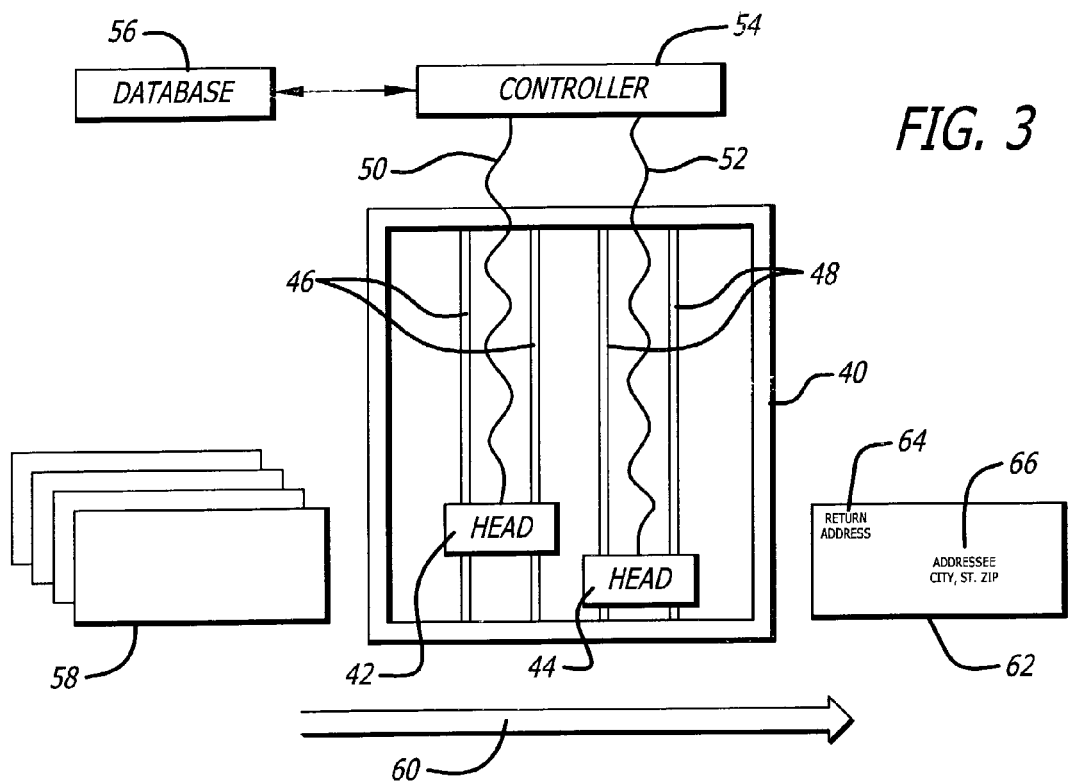
FIG. 3 is a diagram of a printing system, according to an illustrative embodiment of the present invention processing standard sized envelopes.

The present invention advances the prior art by sorting and queuing each batch of print jobs so that print head movement is minimized. Reference is directed to FIG. 3, which is an illustration of an illustrative embodiment of the present invention. A carriage assembly 40 supports two movable print heads 42, 44. Print head 42 is slideable along a single vertical axis defined by support rods 46. Print head 44 is slideable along a single vertical axis defined by support rods 48. The print heads are manually movable along their respective axes and are fixed in position by a set screws (not shown) or other retaining mechanisms, as are understood by those skilled in the art. A supply of media 58 is processed through the printing system, each item being imprinted with a unique address and return address in illustrative embodiment.

In FIG. 3, the media is a #10 business envelope. Each envelope traverses (direction 60) the carriage assembly 40 and passes in front of print heads 42 and 44. A controller 54 establishes a registration for each envelope and controls the speed at which each envelope laterally traverses (direction 60) the printing carriage 40. The first print head 42 is positioned along the vertical dimension of the printing carriage 40 such that it aligns with the return address position 64 on each printed envelope 62. The second print head 44 is positioned along the vertical dimension of the printing carriage 40 such that it aligns with the address position 66 of each printed envelope 62.

During each printing operation, the controller 54 communicates the printing command and data to each of the print heads 42, 44 through interface cables 50, 52, respectively. The controller synchronizes the moment that each print command is sent with the known position of each envelope so that the lateral position of each printed area is in accordance with the print job specifications. Each print job in a batch of print jobs being processed include both lateral and vertical print position specifications, as well as other pertinent information about each print job. This information is stored in memory in database 56 and is arranged as a relational database in the illustrative embodiment.

Prior to running a particular batch of print jobs, the controller 54 sorts the print jobs using the vertical print head position specification as an index in the relational database. The sort can be either in ascending or descending order of print head position magnitude. The net result of the sort is that print jobs with the same print head vertical alignment specification are sorted to be adjacent to one another in the sorted list. Then, as print jobs in the batch are processed, the number of print head adjustments is reduced. There are a number of more sophisticated aspects contemplated in the present invention the foregoing process that have to do with batch size and delineation, and how multiple print head systems are sorted, these will be more fully discussed hereinafter.

Figure 4:
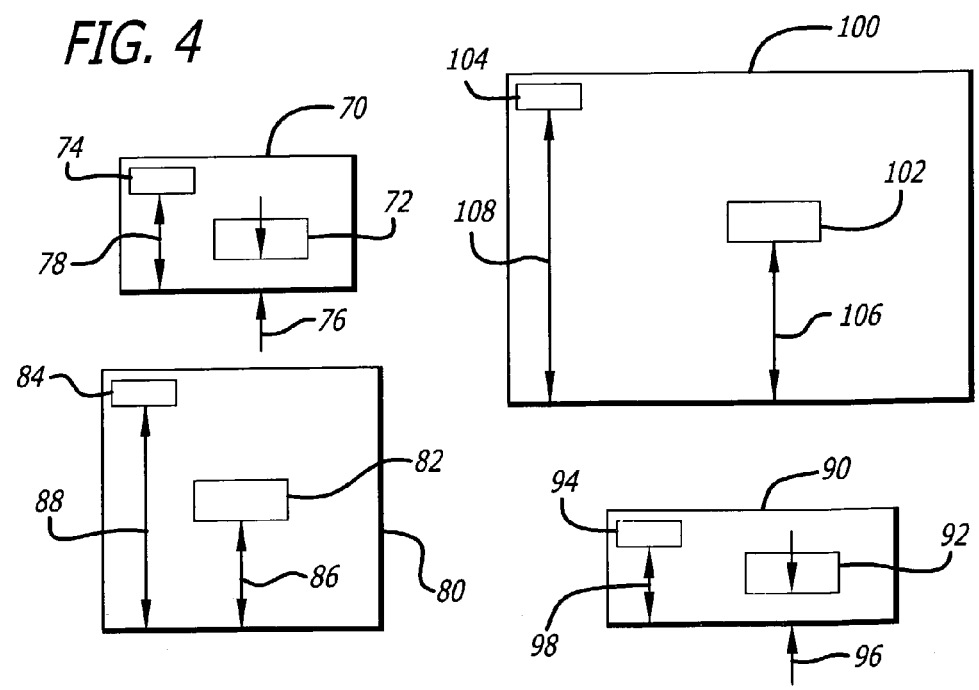
FIG. 4 is a diagram of various envelope sizes and print head printing positions.

FIG. 4 illustrates four examples 70, 80, 90, 100 of media types along with typical specifications for vertical print head alignment as they are applied in the illustrative embodiment sorting process. A C6 sized envelope 70 has a main address 72 vertical offset position 76 of 1.5" and a return address 74 vertical offset position 78 of 3.0". A 5"×7" sized envelope 80 has a main address 82 vertical offset position 86 of 2.1" and a return address 84 vertical offset position 88 of 4.0". A #10 sized envelope 90 has a main address 92 vertical offset position 96 of 1.6" and a return address 94 vertical offset position 98 of 3.3". A C4 sized envelope 100 has a main address 102 vertical offset position 106 of 4.1" and a return address 104 vertical offset position 108 of 8.5". Naturally, absent the teachings of the present invention, as a batch of print jobs that specify these sizes of envelopes and offset dimensions are processed randomly, there is likely to be a print head positions change between every print job.

Figure 5:
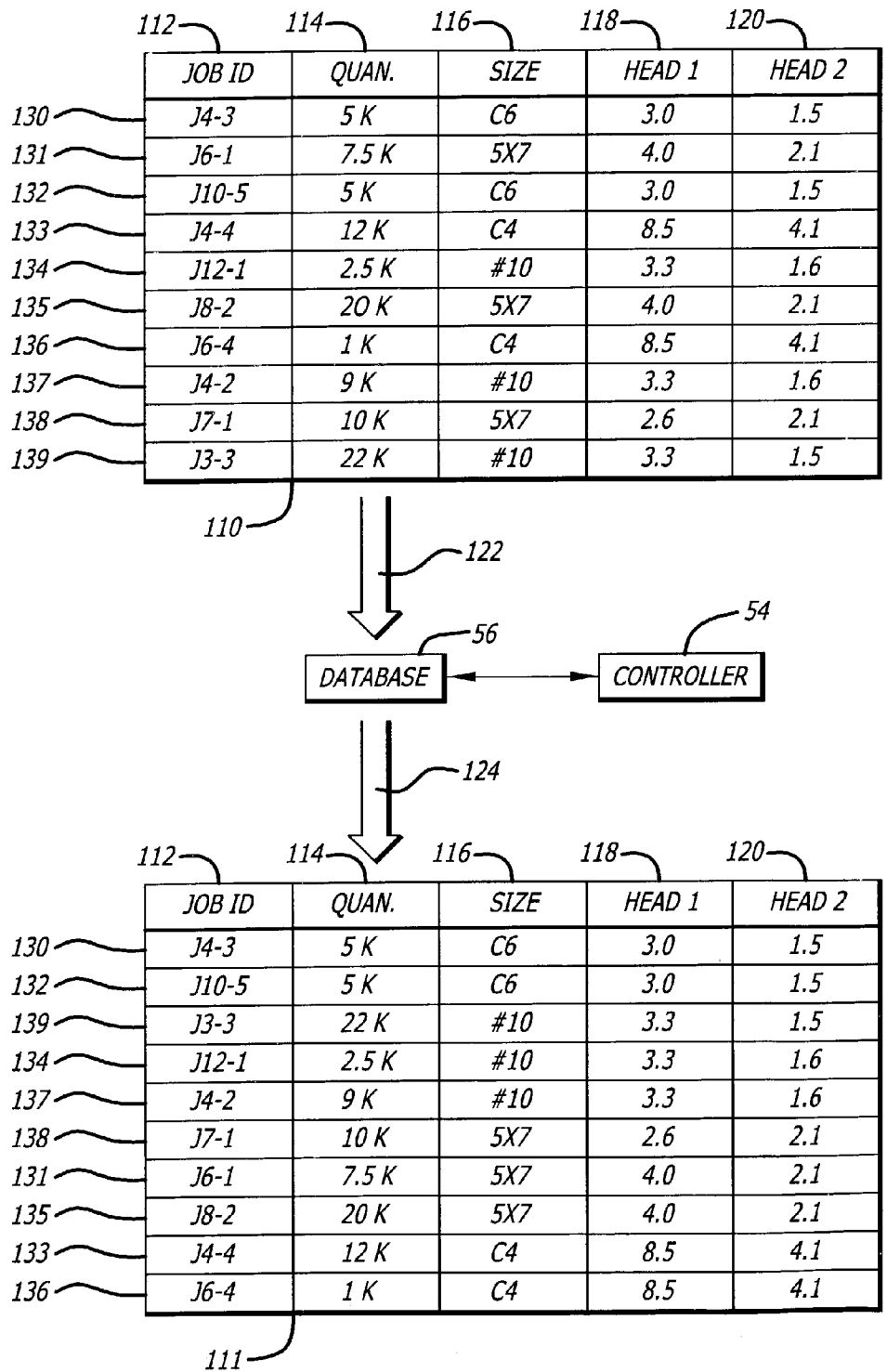
FIG. 5 is a database structure and processing diagram, according to an illustrative embodiment of the present invention.

Reference is directed to FIG. 5, which is a diagram illustrating the sorting process and system according to an illustrative embodiment of the present invention. Table 110 is a typical batch of print jobs applied in the illustrative embodiment. A partial sampling of the print job specifications is included in table 110. These appear in a random order, such as how a printer or mass mailer might receive orders from customers. Each row 130 through 139 of table 110 contains a single print job. The columns (112–120) indicate the data in each field of the rows. The first column 112 is a print job identifier, which is assigned as the print jobs are added to the table. The second column 114 contains the quantity of items to be printed in thousands ("5 K" means 5000 items). The third column 116 is the media size for each print job. In this illustration, the same media sizes as those described with respect to FIG. 4 are used. The fourth column 118 in FIG. 5 is the first print head vertical offset position dimension in inches and the fifth column 120 is the second print head vertical offset position dimension in inches. The print jobs are transferred 122 into a memory containing database 56 that is coupled to the controller 54. The table 110 is arranged as a relational database in database 56 in the illustrative embodiment, however any other suitable memory structure understood by those skilled in the art could be applied to the storage arrangement.

The table 110 may represent a single batch of print jobs to be processed, or it may be further subdivided into plural batches. The question of batch size is a business issue that affects the performance of the present invention to some degree. Generally speaking, the larger the batch, the better the performance of the present invention will be. However, as a practical matter, most operations will limit batch size to a given work shift, or to a given processing line, or to a group of print jobs that have a certain delivery deadline. In addition to sorting each particular batch, the present invention contemplates sorting a large group of print jobs into plural batches of print jobs that are selected to minimize print head movement. Of course, practical limitations in business production requirements will limit the extent to which such batch sorting can be applied.

The controller 54 reads the data stored in the memory 56 and performs a sorting operation on the database that is indexed by the print head offset dimensions 118 and 120. The sorted output is placed (arrow 124) into sorted table 111 in FIG. 5. Of course, since there are two index fields, columns 118 and 120, there are two possible sort orders. More particularly, there are two mathematical permutations (e.g. two elements taken as two ordered elements at a time). Thus, the controller processes two sorts and determines which of the two results in the fewest head positions changes. Stated more generally, the controller 54 performs as many sorts as there are permutations of the various print head adjustments. For example, one print head with one dimension of adjustment would result in a single permutation (e.g. the trivial case of one element taken one at a time). Two print heads each having two dimensions of adjustment would result in twenty-four trial sorts (e.g. four elements taken as order groups of four elements at a time).

Consider the unsorted table 110 in FIG. 5. There are two print head adjustments required between each print job. For example, consider print job J4-3 130 which has print head settings of 3.0" and 1.5", and the next print job J6-1 131 which has print head setting of 4.0" and 2.1". If the table is left unsorted, then there will be a print head adjustment made to both print heads between print jobs 130 and 131. An analysis of table 110 will demonstrate that eighteen print head adjustments must be made to process all of the print jobs in the order presented (e.g. 130, 131, 132, 133, 134, 135, 136, 137, 138, 139). After the sorts are performed and the best sort selected by controller 54, the sorted print job order becomes 130, 132, 139, 134, 137, 138, 131, 135, 133, 136. An analysis of the print head adjustment required for the sorted table 111 will demonstrate that only seven print head adjustments are required if the print jobs are printed in the sorted order. This is a substantial reduction in the number of print head position adjustment required.

In addition to the aforementioned sorting processes, the controller 54 can also perform certain job ordering according to the availability of resources and for the convenience of the operators of the system. For example, after sorting the jobs, various groupings of like print head positions will result. The controller 54 then further optimizes the print head repositioning times to be at times convenient to the end user. For example, the example given in FIG. 5 has Jobs 133 and 136, which are grouped together due to common print head position. These jobs could be executed before job 130, if this were advantageous for other reasons (such as having personnel available to manually move print heads) without affecting the total number of print head movements required.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. A printing system with an adjustable position print head, comprising:
   first means for providing data relating to a plurality of print jobs and
   second means coupled to said first means for sorting said print jobs into an ordered list according to print head position requirements therefor so as to require a fewest number of position changes to the print head to print the print jobs.

2. The invention of claim 1 further including third means, coupled to said second means, for executing said print jobs in accordance with said ordered list.

3. The invention of claim 2 wherein said third means is a print mechanism.

4. The system in claim 2 further comprising:
   fourth means, coupled to said second means, for automatically adjusting the print head position, wherein said means or automatically adjusting the print head position adjusts the print head position in accordance with a current one of said output print head position requirements prior to processing each print job if said print head position changed from the print head position specified in the previous print job.

5. The invention of claim 1 wherein said first means is a memory.

6. The invention of claim 1 wherein said second means is a controller.

7. The system in claim 1 wherein said second means is operable to segment said plurality of print jobs according to periods of time during which print jobs are to be processed.

8. The system in claim 7 wherein said periods of time are divided into production periods.

9. The system in claim 7 wherein said periods of time are divided according to print job production deadlines.

10. The system in claim 1 wherein said second means is operable to sort in ascending or descending order of said print head position requirements magnitude.

11. The invention of claim 1 wherein the print head is an inkjet print head.

12. A printing system with an adjustable position print head, comprising:
    first means for providing data relating to a plurality of print jobs and
    second means coupled to said first means for sorting said print jobs into an ordered list according to print head position requirements therefor, wherein the printing system comprises plural print heads having plural corresponding print head position specifications, and wherein said second means is operable to sort and test plural permutations on the order in which said plural print head position specifications may be taken and operable to select the one of said permutations that requires the fewest print head position changes to produce said ordered list.

13. A printing system with an adjustable position print head, comprising:
    a memory;
    a controller coupled to said memory;
    software running on said controller effective to cause said controller to sort print jobs into an ordered list according to print head position requirements therefor so as to require a fewest number of position changes to the print head to print the print jobs; and
    a print mechanism, coupled to said controller, for executing said print jobs in accordance with said ordered list.

14. The printing system of claim 13, wherein said print head is positionable along a first axis, and wherein the print mechanism is adapted to move at least one of a print medium or said print head relative to each other along a second axis substantially orthogonal to the first axis.

15. A method of processing print jobs comprising the steps of:
    receiving a plurality of print jobs;
    sorting said plurality of print jobs into an ordered list according to print head position requirements therefor so as to require a fewest number of position changes to the print head to print the print jobs; and
    executing said print jobs in accordance with said ordered list.

16. The method of claim 15 further comprising the step of segmenting said plurality of print jobs into periods of time during which print jobs are to be processed.

17. The method in claim 16 wherein said periods of time are divided into production periods.

18. The method in claim 16 wherein said periods of time are divided according to print job production deadlines.

19. The method of claim 15 further comprising the step of adjusting the print head position in accordance with a current one of said output print head position requirements prior to processing each print job if said print head position changed from the print head position specified in the previous print job.

20. The method of claim 19 wherein said adjusting step is accomplished automatically.

21. The method of claim 15 wherein said ordered list is sorted in ascending or descending order of said print head position requirements magnitude.

22. The method of claim 15, wherein the executing includes:
    positioning at least one print head at a fixed position required for an individual one of the print jobs; and
    printing said individual one of the print jobs with said at least one print head positioned at said fixed position.

23. The method of claim 22, wherein the executing includes:
    printing at least one other individual one of the print jobs with said at least one print head positioned at said fixed position without repositioning said at least one print head, wherein said at least one other individual one of the print jobs requires said at least one print head to be positioned at said fixed position.

24. A method of processing print jobs using a printing system that comprises plural print heads having plural corresponding print head position specifications, the method comprising:

receiving a plurality of print jobs;

sorting said plurality of print jobs into an ordered list according to print head position requirements therefor, wherein said sorting further comprises sorting and testing plural permutations on the order in which said plural print head position specifications may be taken and selecting the one of said permutations that requires the fewest print head position changes to produce said ordered list; and executing said print jobs in accordance with said ordered list.

25. Software embodied on a computer-readable medium and adapted for execution by a computer for processing print jobs using an adjustable position print head, comprising:

code for receiving a plurality of print jobs;

code for sorting said plurality of print jobs into an ordered list according to print head position requirements therefor so as to require a fewest number of position changes to the print head to print the print jobs; and code for executing said print jobs in accordance with said ordered list.

26. The software of claim 25 further comprising code for segmenting said plurality of print jobs into periods of time during which print jobs are to be processed.

27. The software of claim 26 wherein said periods of time are divided into production periods.

28. The software of claim 26 wherein said periods of time are divided according to print job production deadlines.

29. The software of claim 25 further comprising code for adjusting the print head position in accordance with a current one of said output print head position requirements prior to processing each print job if said print head position changed from the print head position specified in the previous print job.

30. The software of claim 25 wherein said ordered list is sorted in ascending or descending order of said print head position requirements magnitude.

31. Software embodied on a computer-readable medium and adapted for execution by a computer for processing print jobs using a printing system that comprises plural print heads having plural corresponding print head position specifications, comprising:

code for receiving a plurality of print jobs;

code for sorting said plurality of print jobs into an ordered list according to print head position requirements therefor, wherein said code for sorting further comprises code for sorting and testing plural permutations on the order in which said plural print head position specifications may be taken and selecting the one of said permutations that requires the fewest print head position changes to produce said ordered list; and code for executing said print jobs in accordance with said ordered list.

* * * * *

UNITED STATES PATENT AND TRADEMARK OFFICE
CERTIFICATE OF CORRECTION

| | |
|---|---|
| PATENT NO. | : 7,113,303 B2 |
| APPLICATION NO. | : 10/283575 |
| DATED | : September 26, 2006 |
| INVENTOR(S) | : Robert Sesek et al. |

It is certified that error appears in the above-identified patent and that said Letters Patent is hereby corrected as shown below:

On the Title Pge, Item (73), in "Assignee", line 2, delete "LP.," and insert -- L.P., --, therefor.

Signed and Sealed this

Fourth Day of August, 2009

JOHN DOLL
*Acting Director of the United States Patent and Trademark Office*